C. B. FORD.
HOSE SUPPORTER CLAMP.
APPLICATION FILED SEPT. 23, 1914.
1,161,650.
Patented Nov. 23, 1915.
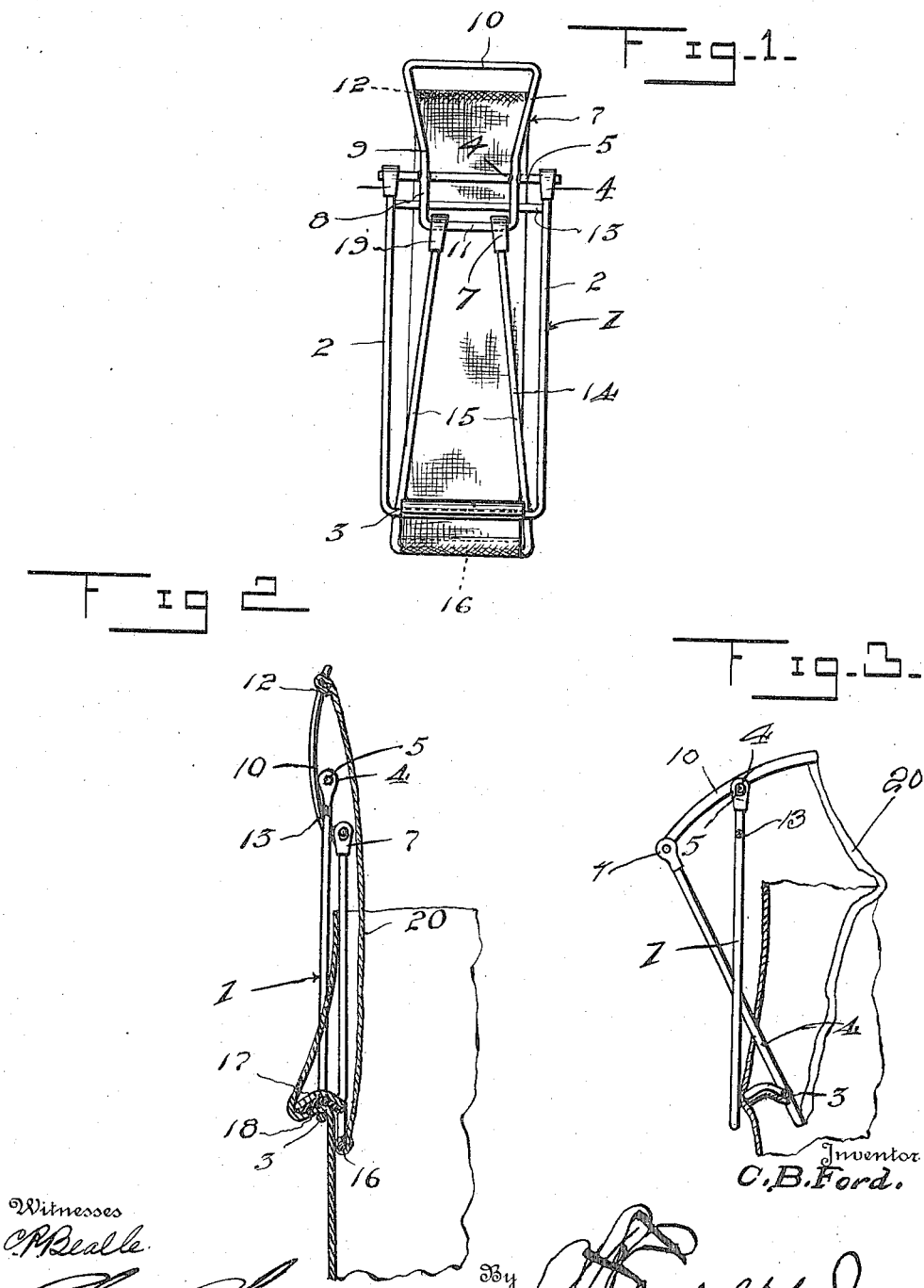

UNITED STATES PATENT OFFICE.

CLAYTON B. FORD, OF PORTLAND, OREGON.

HOSE-SUPPORTER CLAMP.

1,161,650. Specification of Letters Patent. Patented Nov. 23, 1915.

Application filed September 23, 1914. Serial No. 863,156.

*To all whom it may concern:*

Be it known that I, CLAYTON B. FORD, a citizen of the United States, residing at Portland, in the county of Multnomah and State of Oregon, have invented certain new and useful Improvements in Hose-Supporter Clamps; and I do hereby declare the following to be a full, clear, and exact description of the invention, such as will enable others skilled in the art to which it appertains to make and use the same.

My invention relates to new and useful improvements in clamps for supporting hose and resides in the provision of simple inexpensive and effective clamps that will securely hold hose in position and in such manner that injury thereto is prevented.

Another object is to provide a clamp of the character described that is of simple construction, is comparatively small and which may be easily and cheaply manufactured.

The above and additional objects are accomplished by such means as are illustrated in the accompanying drawings, described in the following specification and then more particularly pointed out as claimed.

With reference to the drawings, wherein I have illustrated the preferred embodiment of my invention as it is reduced to practice, and throughout the several views of which similar reference numerals designate corresponding parts—

Figure 1 is a front elevation of my improved hose clamp, Fig. 2 is a vertical sectional view taken centrally through Fig. 1 showing the device as it would appear when in operation, and Fig. 3 is a side elevation showing the device in open position.

Referring to the drawings by characters of reference, the numeral 1 designates as an entirety a U-shaped clamping frame comprising the side bars 2 which are connected at their lower terminals by means of the bight portion 3, the opposite ends of the side bars are provided with the bearing eyes 4 in which the shaft or pin 5 is journaled. This clamping frame 1 is preferably formed of a relatively stiff wire to give the same the desired strength and resiliency.

Rigidly secured to the shaft 5 is the controlling lever designated generally by the numeral 7 which comprises the side bars 8, the upper ends of which are bent outwardly as at 9 and are connected by the bar 10. The lower terminals of the side bars 8 are connected by the bar 11 to which the coöperating U-shaped clamping frame, which will be more fully hereinafter described, is pivoted. The lever 7 is formed of the same material as the frame 2 and the side bars of this lever are curved as clearly shown in Figs. 2 and 3. A transversely extending bar 12 is connected to the bars 8 at a point slightly below the bar 10, and this bar is arranged to support the webbing which will be more fully hereinafter described. A similar transversely extending bar 13 is connected across between the arms 2 of the clamping frame 1 near the bearing eyes 4, and this bar is arranged to form a stop to prevent the lever 7 from swinging past a predetermined point.

The coöperating U-shaped clamping frame hereinbefore mentioned is designated generally by the numeral 14, and comprises the converging side bars 15 which are connected at their widest extremities by the bar 16, this bar 16 is arranged to form the bight portion of the coöperating U-shaped clamping member as will be clearly seen upon referring to the drawings. A suitably transversely extending clamping plate 17 is secured between the bars 15 at a point slightly above the bar 16, and this clamping plate carries the pad 18 which is arranged to prevent the device from injuring the article of clothing upon which it is used. The upper terminals of the bars 15 are provided with the bearing eyes 19, which are arranged to surround the bar 11 of the lever 7 and thereby form a pivotal connection between the lever and the auxiliary U-shaped clamping member.

Connected between the bar 16 and the bar 12 is a strip of flexible material designated by the numeral 20 which is designed to lie between the flesh of the user and the clamp as will be clearly seen upon referring to Figs. 2 and 3. This strip 20 is so constructed that it will protect the user from the clamp and prevent any injury from occurring from the use.

From the foregoing it will be obvious that the U-shaped clamping frame 14 is placed on the inside of the hose with the lever 7 and clamping frame 1, in the position illustrated in Fig. 3. The U-shaped clamping frame 1 is then swung inwardly and the lever upwardly until the bar 13 engages the lower end of the lever as shown in Fig. 1. In this position it will be evident that the clamping frames will be in their clamping position illustrated in Fig. 2 and firmly grip the article of clothing upon which they are used. It will thus be seen that a simple and effective clamp for supporting hose is provided which will firmly hold the article and protect the user from any injury, due to the fact that applicant has provided a flexible member 20.

In practice, I have found that the form of my invention, illustrated in the drawings and referred to in the above description, as the preferred embodiment, is the most efficient and practical; yet realizing that the conditions concurrent with the adoption of my device will necessarily vary, I desire to emphasize the fact that various minor changes in details of construction, proportion and arrangement of parts may be resorted to, when required, without sacrificing any of the advantages of my invention, as set forth.

What is claimed is:—

A hose clamp comprising a U-shaped clamping frame having the free terminals of its sides provided with eyes, a second U-shaped clamping frame associated with the first mentioned clamping frame and provided with eyes, a bar extending transversely of the first mentioned U-shaped clamping frame and disposed below and adjacent the eyes in the terminals of the sides of the said frame and having its opposite ends secured to the sides of the said frame, an operating lever located at the upper end of the first mentioned U-shaped frame and having one end connected in the eyes in the second mentioned U-shaped clamping frame and including a substantially rectangularly shaped frame having the sides thereof formed into arcuate shape, a shaft rigidly secured to the operating lever and extending transversely thereof and having its opposite ends journaled within the eyes in the sides of the first mentioned U-shaped clamping frame, and a strip of flexible material having its opposite ends connected, respectively, to the second mentioned U-shaped clamping frame and the operating lever.

In testimony whereof I affix my signature in presence of two witnesses.

CLAYTON B. FORD.

Witnesses:
A. A. LEAMING,
N. E. FARNSWORTH.

Copies of this patent may be obtained for five cents each, by addressing the "Commissioner of Patents, Washington, D. C."